United States Patent [19]
Goldfischer

[11] 3,822,940
[45] July 9, 1974

[54] VELOCIMETER
[75] Inventor: Lester I. Goldfischer, New Rochelle, N.Y.
[73] Assignee: The Singer Company, Little Falls, N.J.
[22] Filed: Oct. 20, 1972
[21] Appl. No.: 299,316

[52] U.S. Cl. .................................. 356/28, 356/170
[51] Int. Cl. ............................................ G01p 3/36
[58] Field of Search...356/28, 169, 170; 250/237 G

[56] References Cited
UNITED STATES PATENTS
3,525,569  8/1970  Gamertsfelder et al. ............. 356/28
3,723,004  3/1973  Brayton ............................. 356/28

Primary Examiner—Maynard R. Wilbur
Assistant Examiner—S. C. Buczinski
Attorney, Agent, or Firm—T. W. Kennedy

[57] ABSTRACT

The present invention relates to velocity measuring devices wherein the center frequency of a pattern of backscattered energy, proportional to the relative velocity between two objects, is detected. In particular it improves the accuracy of prior art systems by desensitizing the device to variations in distance between the device and the reflecting surface. This is achieved by interposing in the receiving section of the device a limiting aperture which restricts the backscattered energy contributing to the detected pattern to that energy which remains identical as the reflected surface passes through the field of illumination of the device.

6 Claims, 3 Drawing Figures

VELOCIMETER

BACKGROUND OF THE INVENTION

The invention herein described was made in the course of or under a contract, or subcontract thereunder with the Department of the Army.

The present invention relates generally to velocity measuring devices and more particularly to improvements in the velocity measuring device originally described in U.S. Pat. Nos. 3,432,237 and 3,525,569, which are assigned to the same assignee as the present application.

In the velocity measuring device described in the aforementioned patents, a monochromatic, well collimated beam, preferably a laser, is directed towards a reflecting surface which exhibits a velocity relative to the structure supporting the velocity measuring device. A portion of the energy back-scattered from the reflecting surface is passed through an optical diffraction grating and impinges on a photomultiplier tube which has its anode connected to a frequency tracker, the output of which is a function of the relative velocity between the reflecting surface and the support structure.

U.S. Pat. No. 3,525,569 recognizes that in situations where the reflecting surface exhibits a "flutter" effect, the basic device as described in U.S. Pat. No. 3,432,237, would suffer a deterioration in the output frequency indication. The reasons for such deterioration are adequately set forth at column 3, line 48 through 62 inclusive of U.S. Pat. No. 3,525,569.

U.S. Pat. No. 3,525,569 describes a technique of using a well collimated monochromatic beam plus a lens interpared between the reflecting surface and the optical grating to desensitize the device to variations in the range between the reflecting surface and instrument. This approach resulted in a device which remained substantially independent of vertical surface position for relatively small deviations from the conjugate plane.

In certain applications, the accuracy requirements of the velocity measuring device require that something more than the techniques of U.S. Pat. No. 3,525,569 be utilized. Such requirements may exist, for example, when the velocimeter is used as a prime data source for a navigation system on a land vehicle such as a jeep. In such systems, the velocimeter output is combined optimally with the data of an inertial navigation system utilizing Kalman filter techniques. System accuracy requirements may require that the velocimeter output data be accurate to ±0.03 percent of nominal over instrument to reflecting surface range variations of approximately ± 5 inches of nominal. Such accuracies are inherent in the velocimeter described in U.S. Pat. No. 3,525,569, but only when the reflecting surface is in the plane conjugate to the grating plane (e.g. plane 38 in FIG. 4 of U.S. Pat. No. 3,525,569 is conjugate to grating plane 22) or when deviations from the conjugate plane are relatively minor.

Where variations in instrument to reflecting surface range are on the order of ± 5 inches, the system described in U.S. Pat. No. 3,525,569 provides velocity measurements accurate to within ±0.1 percent of nominal — insufficient for use in the aforementioned navigation system.

SUMMARY OF THE INVENTION

The present invention achieves the tighter accuracy requirement over relatively large range to reflecting surface variatives through the utilization of a telecentric aperture interposed between the lens and optical grating as depicted in U.S. Pat. No. 3,525,569. The telecentric aperture has a predetermined location in the focal plane of the lens and an opening with a predetermined diameter which makes it the limiting aperture in the receiving system of the velocimeter vis a vis the lens being the limiting aperture in U.S. Pat. No. 3,525,569. With the telecentric aperture positioned as noted, the speckle pattern incident on the optical grating maintains its integrity longer, since the aperture forces the scatterers contributing to any one point in the speckle pattern to remain essentially the same and bear the same phase relationship, one to the other, as the pattern moves across the optical grating.

It is therefore an object of this invention to provide a more accurate velocimeter device wherein a reflected pattern of a monochromatic incident beam provides the desired velocity information.

It is a further object of this invention to improve the accuracy of such a device by interposing a limiting aperture in the path of the reflected beam to thereby force the contributing rays to each point of the image pattern to remain essentially the same as the reflecting surface moves relative to the velocimeter.

DESCRIPTION OF A PREFERRED EMBODIMENT

In order to better explain the operation of the present invention, some time should be spent in describing the prior art and the deficiencies thereof.

Figure 1:
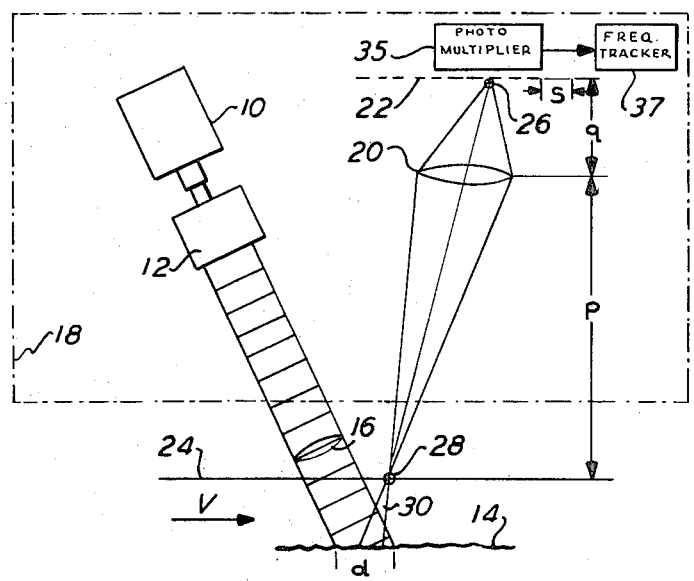
FIG. 1 is a schematic representation of a prior art velocity measuring device.

Referring to FIG. 1, the prior art velocity measuring device comprises a source 10 of essentially monochromatic, radiant energy which passes through a lens arrangement 12, similar to reference character 18 of U.S. Pat. No. 3,525,569, before impinging on reflecting surface 14. Lens arrangement 12 collimates and reshapes the beam, emanating from source 10, such that it assumes an elliptical crossection, 16 whose major axis is substantially aligned with the velocity vector V which represents the relative velocity between the reflecting surface 14 and the supporting structure 18 upon which the velocity measuring device is mounted. By reshaping the beam in this fashion the power density of illumination per unit area along the direction of vector V is increased thereby increasing the signal to noise ratio to usable levels.

The receiving portion of the prior art system consists of a second lens element 20, which need be nothing more than a simple double-convex converging lens, and optical diffraction grating 22. The diffraction grating 22 is placed at the image plane of lens 20, and has an aperture spacing S. The grating is positioned so that its individual, transparent or translucent apertures are longitudinally normal to the velocity vector. Lens 20 has associated with it an image conjugate plane 24 which, nominally, corresponds to the object or target plane.

In principle, the lens element 20, will image what appears in the image conjugate plane 24 onto the diffraction grating 22. Due to lens element 20, however, the velocity of each speckle across the grating depends upon the ratio $q/p$ where $q$ represents the image distance and $p$ the object distance of the lens. Where the surface 14 is located in the image conjugate plane, the image of a single resolvable element on the surface comprises a "speckle" which moves across the grating with a velocity of $q/p$ times the surface velocity.

Where the surface 14 is at other than the conjugate plane 24, the image 26 on the grating plane 22 comprises a "speckle," which is the image of conjugate resolvable element 28. Resolvable element 28, in turns, arises due to the contributions of all scatters on surface 14 lying within the area formed by the intersection of cone 30 with the surface 14. As surface 14 moves relative to supporting structure 18, the particular scatterers contributing to conjugate resolvable element 28 will vary. This can be readily seen in FIG. 2. Identical reference numbers are used in FIG. 2 to identify items identical to FIG. 1. Primed numbers are used to indicate items associated with a subsequent position of the conjugate resolvable element 28.

When the surface 14 first moves into the illuminated area, conjugate resolvable element 28 eventually develops which is produced by scatterers bounded within the extreme rays 32 and 34. These scatterers may be considered to consist of a group A bounded by ray 34 and ray 36 and group B bounded by extreme ray 32 and ray 36.

As the surface 14+ moves to the right, resolvable element 28' develops which is a composite of contributions due to scatterers within Group A' and those within Group C. The scatterers within Group A and Group A' are identical and to that extent conjugate resolvable elements 28 and 28' are identical. However, the scatterers comprising group B are not identical to those within group C with the result that the conjugate resolvable element 28' as imaged on grating 22 at 26' is not identical to resolvable element 28. The change in contributing scatterers alters the center frequency of the spectrum of frequencies detected by photomultiplier 35 and frequency tracker 37 (see FIG. 1), and may be considered a change in the calibration constant of the instrument, such change being proportional to the amount of deviation of the surface 14 from the image conjugate plane 24.

Figure 2:
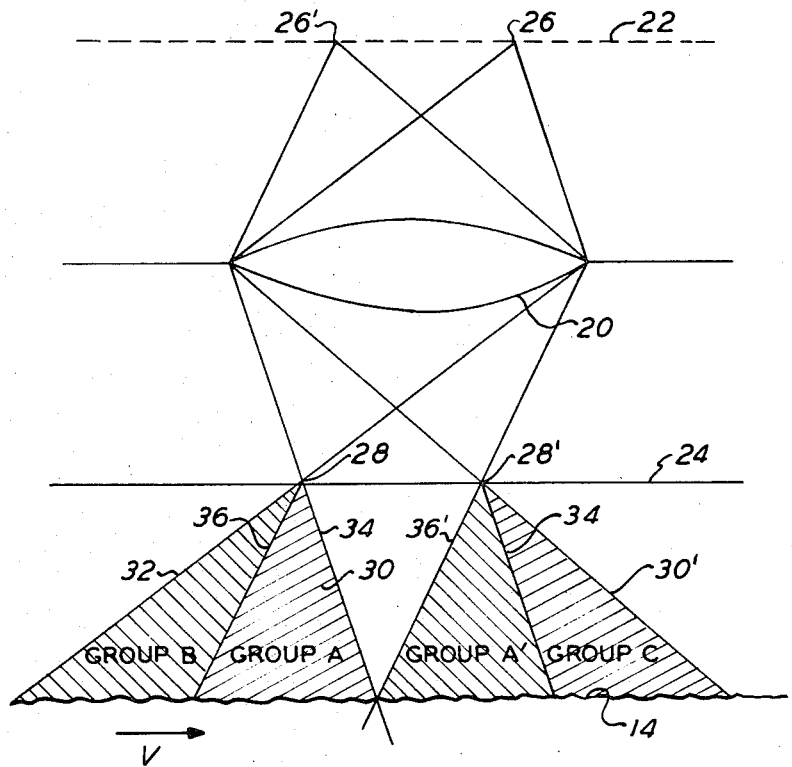
FIG. 2 is a schematic illustrating a typical ray pattern associated with FIG. 1.
Figure 3:
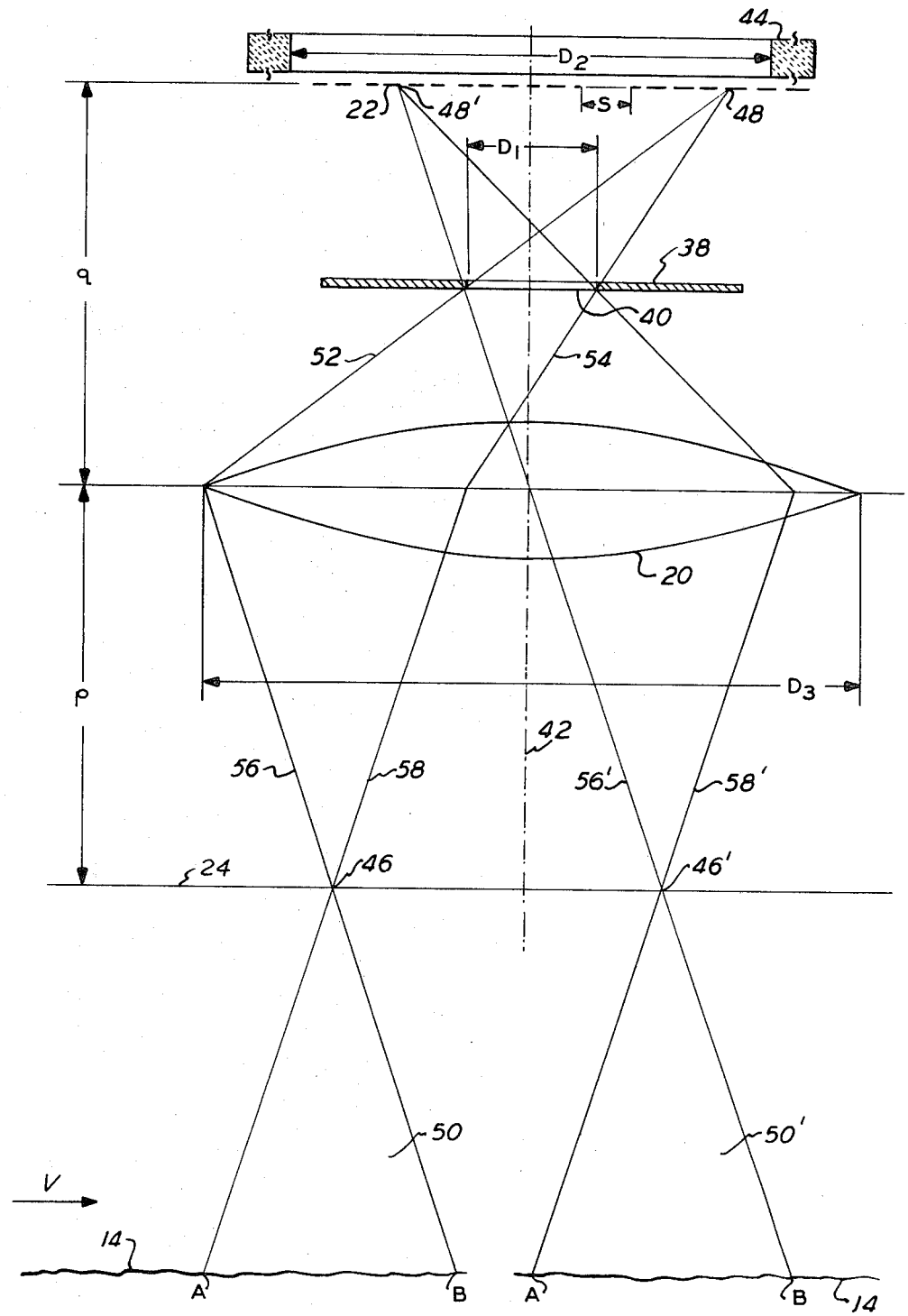
FIG. 3 is a schematic representation illustrating the operation of the present operation.

FIG. 3 shows the effect of the present invention on the group of scatterers which give rise to the conjugate resolvable elements for various positions of the surface 14. Elements similar to those shown in FIG. 1 and FIG. 2 will be identified by identical reference number.

The present invention is essentially a modification to the prior art device depicted in FIG. 1 described in U.S. Pat. No. 3,525,569. Although for purposes of the prior art invention the beam projected from the monochromatic source is manipulated to have the long axis of the incident beam parallel to the velocity vector of the reflecting surface, it is to be understood that for purposes of the present invention it is not absolutely necessary that the incident beam be elliptical as described in U.S. Pat. No. 3,525,569. It is perfectly suitable for purposes of this invention that the illuminating beam be circular in cross-section, although, for certain practical applications, in order that signal-to-noise ratios be at suitable levels it is preferable to configure the illuminating beam as depicted in the referenced patent.

Referring to FIG. 3, the present invention requires the placement of a telecentric aperture 38, midway between lens 20 and optical diffraction grating 22. This position corresponds to the principal focal plane of lens 20. The telecentric aperture 38, is nothing more than an opaque material having an opening 40 of predetermined diameter $D_1$, as will hereinafter be explained. The telecentric aperture 38 is preferably, symmetrically positioned with respect to the optical axis 42 of the receiving lens, diffraction grating system such that the plane of the aperture is substantially perpendicular to the optical axis 42. It is secured to the supporting structure 18, in any suitable manner.

Located at the optical diffraction grating 22, in both the prior art and present systems, although not particularly identified in the prior art system, is a receiving aperture which hereinafter will be designated the system F/stop, 44. The F/stop may be positioned either immediately in front of or behind the optical diffraction grating 22, and preferably is symmetrically disposed about the optical axis 42. The F/stop 44, has an aperture of sufficient diameter $D_2$, as to include within its field of view a sufficient number of lines and spaces on the diffraction grating 22, such that the image speckled pattern, for anticipated positions of the reflecting surface 14 above or below the image conjugate plane 24, will always fall within the field of view of F/stop 44. The F/stop 44 may be a separate item secured to supporting structure 18, or may form a part of photomultiplier 35.

The number of grating lines per inch of the optical diffraction grating 22, must be consistent with the frequency response characteristics of the frequency tracker 37 to which the output of the photomultiplier 35 is connected. For example, the greater the operating frequency of the tracker, the greater the number of grating lines per inch. The frequency response characteristics of the tracker dictate the number of grating lines per inch of optical diffraction grating 22, which in turn controls the aperture spacing S. Aperture spacing S, controls the resolution requirements of lens 20 and consequently the diameter $D_3$ of lens 20, since the diameter, as well as the object length of lens 20 determines the resolution capability of the lens.

Having established the diameter $D_3$ of lens 20 and diameter $D_2$ and of F/stop 44, and remembering that the telecentric aperture is positioned halfway between the lens 20 and F/stop 44, the maximum diameter $D_1$ which is required to make the telecentric aperture 38 the limiting aperture in the lens, F/stop combination may be determined by the following formula:

$$D_1 \leq D_3 - D_2/2$$

The minimum diameter of opening 40 must be such that the photomultiplier 35 and frequency tracker 37 have an adequate signal to process.

FIG. 3 shows the effect that the placement of the telecentric aperture 38 at the principal focal plane of lens 20 has on the rays emanating from scatterers located on reflecting surface 14. Reflecting surface 14 is shown below the conjugate image plane 24. The image that one sees in the grating plane is what one would see in the conjugate image plane 24 subject to the resolution limitations imposed by the opening of the telecentric aperture. A particular conjugate resolvable element 46 of the backscattered pattern is shown when segment AB of surface 14 first enters the field of view of the receiving portion of the velocimeter and some time later at 46' when segment AB has translated such that it is just about to leave this region. Conjugate resolvable element 46 is imaged on the diffraction grating 22 at 48, while conjugate resolvable element 46' is imaged at 48'.

Element 46 developes due to the contributions of all scatterers located on the surface 14 which give rise to the cone of rays 50. It is to be understood that cone 50 is three dimensional, but for ease of discussion shall be treated as two dimentional. The periphery of opening 40 of telecentric aperture 38 restricts the rays which image at 48 to those within extreme rays 52 and 54. These are the rays which exit from lens 20 after refraction of rays 56 and 58. Rays 56 and 58 converge at resolvable element 46 and are extrapolated beyond this point until they intersect surface 14 at their respective sources. Similarly, the rays which terminate at image 48' can be traced back through 46' to their sources on surface 14, which will hereinafter be shown to be substantially identical to those which resulted in image 48. Based on elementary principles of optics, rays which intersect in the focal plane of a lens, must enter the lens parallel to each other. Therefore rays 56 and 58 are parallel to rays 56' and 58' respectively and the distance between rays 56 and 56' is identical to the distance between ray 58 and 58'. From this, it is apparent that the scatterers contributing to resolvable element 46 are substantially identical to those which give rise to element 46'. Referring to FIG. 2, essentially what the telecentric aperture 38 does, is to eliminate from the rays contributing to the imaged resolvable elements 26 and 26', those rays which are designated as group B and group C; i.e., those which emanate from different scatterers.

Since the scatterers in cone 50 and 50' are identical, the conjugate resolvable elements 46 and 46' are substantially identical and as such the imaged resolvable elements 48 and 48' are substantially identical. Hence, as the scattering surface moves in the object plane and the speckled pattern moves in the image plane, a constant group of scatterers is associated with the intensity at each point in the speckled pattern. Since the scatterers are the same, the conjugate resolvable elements in plane 24 move with the same velocity as the scattering surface 14. Accordingly, the image resolvable elements move in the plane of the diffraction grating 22 with the velocity q/pV regardless of the deviation of the reflecting surface from the image conjugate plane. Thus, the system calibration constant remains substantially independent of vertical surface position.

Experimental data obtained in evaluating the effect of the telecentric aperture indicated improvements in velocity measurement accuracy on the order to 5 to 1. This is the case where the velocimeter is mounted such that the transmitted and reflected rays are essential vertical to the plane of the reflecting surface. Slightly less of an improvement was noted when the transmitted beam was at 45° incidence to the reflecting surface.

Although the opening 40 of aperture 38 is preferably circular, having a diameter $D_1$ in accordance with equation 1, it is to be understood that the telecentric aperture 38 can have an opening 40 of other than a circular shape so long as the opening in the direction of velocity vector V satisfies equation 1 and the opening in the direction perpendicular to the velocity vector V, out of the plane of FIG. 3, is of sufficient width to allow passage of the reflected wave.

Although the above describes a situation where the surface is moving, it is to be understood that the reflecting surface can be stationary with the structure to which the velocimeter is mounted moving relative thereto.

Other modifications and variations within the spirit of the invention will occur to those skilled in the art, hence, it is desired that the present invention be limited only by the true scope of the appended claims.

I claim:

1. In combination with an apparatus for determining the relative velocity between two objects, wherein means are provided for directing a beam of monocromatic wave energy toward one of said objects whereby a portion of said energy is back scattered from the surface of said one object and, wherein lens means for optically resolving the back scattered pattern and for focusing the pattern on means for receiving said back scattered energy including optical grating means and at least one restricted receiving aperature is provided, wherein is provided means for determining the frequency of said pattern and thereby the relative velocity between the two objects, the improvement which comprises the interposition of a telecentric aperature between the optical resolving means and the optical grating means in the path of said back scattered energy, said telecentric aperature to have a maximum diameter governed by the equation: $D_1 \leq D_3 - D_2/2$ where $D_1$ is a diameter of the opening in the telecentric aperature $D_2$ is the diameter of the receiving aperature and $D_3$ is the diameter of the lens means, whereby said telecentric aperature will be the limiting aperature in the combination of itself with the lens means and receiving means.

2. The apparatus of claim 1 where the telecentric aperture is located substantially at the focal plane of said resolving means.

3. The apparatus of claim 2 where the telecentric aperture is symmetrically disposed about the optical axis of said resolving means.

4. The apparatus of claim 1 wherein the opening of said telecentric aperture is circular.

5. The apparatus of claim 4 wherein said means for directing a beam of monochromatic wave energy toward one of said objects includes means for producing a collimated beam having a substantially elliptically shaped cross section, the major axis of which coincides with the relative velocity vector between said two objects.

6. The apparatus of claim 5 wherein said lens means is a simple double-convex converging lens.

* * * * *